TAPE SLACKENER FOR PERFORATOR

Filed May 1, 1964

INVENTORS
STANLEY L. DIEN
GLENN P. STUBENRAUCH
BY E. F. Kane
ATTORNEY

3,229,904
TAPE SLACKENER FOR PERFORATOR

Stanley L. Dien, Park Ridge, and Glenn P. Stubenrauch, Des Plaines, Ill., assignors to Teletype Corporation, Skokie, Ill., a corporation of Delaware Filed May 1, 1964, Ser. No. 364,181
3 Claims. (Cl. 234—128)

This invention relates to tape handling mechanism for perforators and more particularly to mechanism for providing a length of slack tape between a tape supply and the tape feeding elements of the perforator.

In tape perforators for telegraph tape it is essential that the spacing between rows of perforations in the tape be maintained as uniform as possible since tape, after being prepared, may be used repeatedly to control telegraph transmitters and consequently may be subjected to an inordinate amount of wear. If the spacing of the rows of holes in the tape are not closely controlled the wear on the tape may result, ultimately, in errors in transmission.

Tape is supplied to perforators in relatively large rolls having an appreciable amount of inertia and must be fed to the punches, step-by-step, at high speed. Consequently, at the start of each step of tape feed, the tape is subjected to a great amount of tension by the inertia of the tape roll which may tend to interfere with proper feeding.

Accordingly, it is an object of the present invention to reduce the load applied to the tape feed rollers of a tape perforator.

Another object of the invention is to present a slack length of tape to the tape feeding elements of a tape perforator.

A still further object of the invention is to provide mechanism for pulling a short length of tape from a supply roll to present a loop of slack tape for the feed rollers of a perforator to feed to the punches of the perforator.

In accordance with the preferred embodiment of the invention a tape perforator, for telegraph tape, having a main rocker or driving bail for actuating selected tape punches and for actuating the feed rollers that feed tape to the punches of the perforators, is provided with a tape slackening mechanism for supplying a slack length of tape between a supply thereof and the feed rollers. This slackening mechanism includes an oscillatable bracket mounted adjacent a tape guiding platform and rocked in one direction by the driving bail to move a resilient pad into contact with the tape on the platform thereby clamping the tape on the platform with sufficient pressure to prevent the tape from moving in a direction opposite to the direction of tape feed. The bracket carries a tape depressor which is effective, after the tape is clamped, to push a loop of tape down between the end of the platform and a guide post thereby to withdraw a length of tape from a supply roll. When the oscillatable bracket is rocked in the opposite direction it will release the resilient pad and the tape depressor from the tape leaving a slack length of tape for movement by the feed rollers.

A more complete understanding of the details of the invention may be had by reference to the accompanying drawings wherein.

Figures 1, 2, 3:
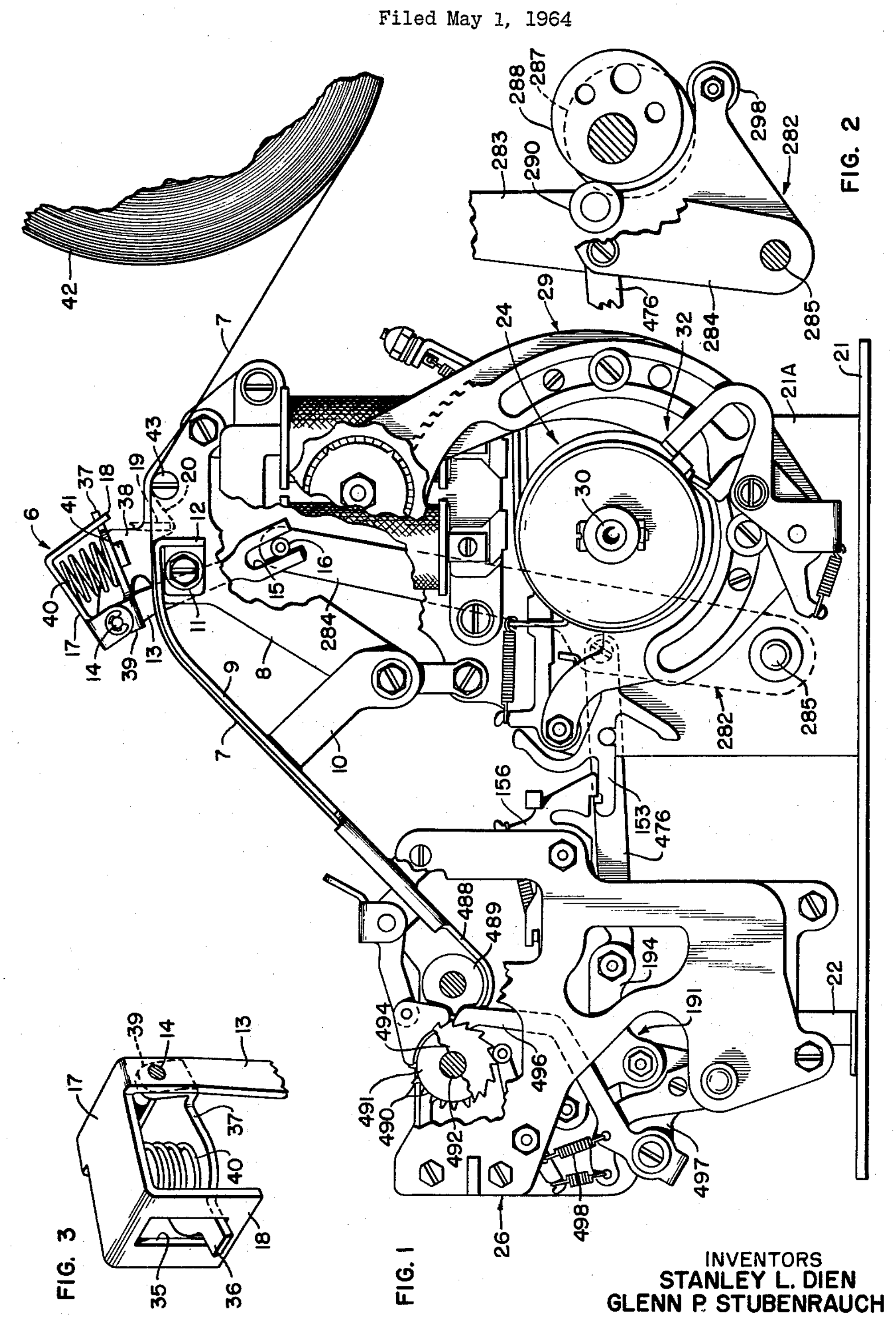
FIG. 1 is a side elevational view of a tape perforator and its associated tape feed mechanism, parts being broken away to more clearly illustrate parts in back of them an dshowing the preferred form of the present invention.
FIG. 2 is a fragmentary sectional view looking in the same direction as in FIG. 1 and showing the relationship between the tape feeding mechanism and the tape slackener.
FIG. 3 is a fragmentary perspective view of the tape slackener mechanism looking from a different angle and shown on a somewhat larger scale than shown in FIG. 1.

In the preferred embodiment of the invention as applied to a telegraph tape perforator of the type disclosed in detail in the patent to R. E. Arko et al. 2,951,902, issued September 6, 1960 a mechanism generally designated by the numeral 6 is provided for supplying a slack length of tape to the perforator mechanism. The above-mentioned patent to Arko et al. is incorporated herein by reference for a complete understanding of the details and operation of the perforator. The same reference numerals are applied to the drawing in this application as are shown in the Arko et al. patent where parts are common to the patent and this disclosure. The operating parts of the apparatus are mounted upon a suitable base 21 from which there extends upwardly a main support casting 21 and a standard 22. These two support elements support all of the parts of the apparatus and form part of a framework in which there are mounted a selector mechanism designated generally by the numeral 24, a punch mechanism shown at 26 and a range finder or orienting device 29 all of which are described in more detail in the patent to Arko et al. mentioned hereinbefore. The apparatus is provided with a suitably supported and driven main power shaft 30 on which there is mounted a clutch mechanism 32 for initiating cycles of operation of the perforator apparatus.

In the apparatus of the Arko et al. patent the selector mechanism 24 controls the tripping of latches 153 which when actuated will release punch selector slides 156 to select punches in the punch mechanism 26 for actuation. These punches (not shown) will be driven through a tape 7 fed into the punch mechanism 26 under power supplied by a toggle mechanism 191 which includes a bell crank lever 194 that is in turn driven by a link 476. The link 476 interconnects the toggle mechanism 191 with a power bail 282 that is oscillated about a rock shaft 285 in each cycle of operation of the apparatus initiated by the clutch 32.

Cyclically in the operation of the apparatus a pair of eccentrics 287 and 288 will be rotated by the shaft 30 and these eccentrics have associated with them a pair of cam rollers 290 and 298 that are rotatably mounted on an arm of the bail 282. A second arm 284 of the bail 282 is pivotally connected to the link 476 and each time the bail 282 is oscillated it will impart reciprocation to the link 476 to actuate the toggle mechanism 191. An arm 497 forming a part of the toggle mechanism 191 is actuated and this arm 497 carries a feed pawl 496 that is urged by a contractile spring 498 into engagement with the teeth of a ratchet 494 fixed to a shaft 492. The shaft 492 also has fixed to it a tape feed roller 491 having a series of pins 490 extending from its periphery to enter into a cooperating series of holes (not shown) in an idler roller 489. With this arrangement a tape 7 which is fed through a tape guide 488 into position between the roller 489 and the roller 491 will have a series of perforations formed in it and will be fed to the left (FIG. 1) one step each time reciprocation is imparted to the feed pawl 496.

Suitably mounted on the framework of the perforator is a mounting plate 8, on which there is in turn supported a tape guide platform 9, extensions 10 and 11 being provided on the platform 9 for attachment to the plate 8. The right end of the platform 9 terminates in a rounded end portion 12. The plate 8 has an upwardly extending portion 38 having a pivot stud 14 fixed in it on which there is pivotally mounted a bracket support lever 13. The lower end of the bracket supporting lever 13 has a bifurcation 15 formed in it to receive a drive pin 16 that is mounted adjacent the upper end of the arm 284 of the bail 282. Each time the bail 282 is rocked about the rocker shaft 285, it will oscillate the bracket supporting lever 13 to move a bracket 17, formed integrally with the lever 13, in an arcuate path. The bracket 17 includes a tape depressor plate 18 which is formed integrally with the bracket 17 and lever 13. The plate 18 has a slot 35 formed in it for receiving a tongue portion 36 of a hinged plate 37 which is provided with a pair of upwardly extending ears 39 that serve to pivotally mount the plate 37 on the pivot stud 14. The plate 37, as most clearly shown in FIG. 3, is normally held against the bottom of the slot 35 by a compression spring 40 interposed between it and the flat top portion of the bracket 17. The plate 37 carries a resilient pad 41 on its lower surface which will be spring pressed into clamping engagement with the upper surface of tape 7, withdrawn from a supply roll 42 and fed over a guide post 43, whenever the bail 282 rocks counterclockwise to oscillate the bracket 17 clockwise about the pivot stud 14.

In each cycle of operation of the perforator, the ratchet 494 will be driven by the pawl 496 when the link 476 is moved to the right due to the clockwise movement of the bail 282, thus, to pull a short length of tape 7 through the tape feed rollers 489 and 491. This will cause the bracket support lever 13 to move to the position shown in FIG. 1 where the resilient pad 41 and tape depressor plate 18 are completely disengaged from the tape 7.

As the link 476 moves to the left (FIG. 1) the pawl 496 will be moved downwardly to engage a succeding tooth on the ratchet 494 and, as the link 476 approaches the end of its travel to the left on the counterclockwise rocking movement of the bail 282, the arm 284 of the bail 282 acting through the drive pin 16 will rock the bracket 17 clockwise. In rocking clockwise the bracket 17 will carry the resilient pad 41 down into engagement with the tape 7 on the platform 9 and shortly after the resilient pad 41 engages and clamps the tape 7. The continued movement of the bracket 17 in a clockwise direction will cause the edge of the depressor plate 18 to engage the tape. As the bracket 17 continues to rotate clockwise the depressor plate 18 will move down to the position shown by the dotted lines 19 to form a loop, as indicated by the dotted lines 20, in the tape 7. During the last portion of the clockwise movement of the bracket 17, the spring 40 will be compressed holding the resilient friction pad 41 on the tape while the loop or slack portion 20 is formed in it. Thus, on the next movement of the bail 282 in a clockwise direction to drive the pawl 494 a slack section of tape will be provided so that the feed rollers 489 and 491 will have only a short length of tape to move. Consequently the inertia of the large roll of tape 42 will not interfere with the operation of the feed rollers and since the tape is first clamped between the platform 9 and resilient pad 41 and then the loop or slack portion 20 is formed in the tape by the depressor plate 18 the load applied to the tape 7 due to the inertia of the roll 42 will be taken up in forming the loop 20.

Although a particular embodiment of the invention is shown in drawings and described in the foregoing specification it will be understood that the invention is not limited to that specific embodiment, but is capable of modification and rearrangement, and substitution of parts and elements without departing from the scope of the invention.

What is claimed is:

1. In a tape perforator having a plurality of selectively actuated punches, a main driving bail, means driven by said bail for actuating the selected punches and for feeding a predetermined length of tape to operative association with the punches on each operation of said bail, a tape supply roll, a tape guide platform over which tape is directed from said roll toward said punches, a tape depressor bracket driven by said main driving bail, a resilient pad carried by said bracket for engagement with said tape to clamp said tape against said platform and thereby prevent the tape from moving in a direction opposite to its movement by the feeding means, a post mounted in spaced relation to an end of said platform and extending transversely of the direction of travel of the tape, and a depressor plate carried by said bracket and operative, after the tape has been clamped, to depress a length of tape between said end of the platform and said post thereby to withdraw a length of tape from the supply roll.

2. Apparatus according to claim 1 wherein a spring urges the resilient pad toward the tap to clamp the tape against the platform in advance of the depressing of the length of tape between the edge of the platform and the post.

3. Apparatus according to claim 1 wherein said bracket is oscillated directly by the main driving bail and the resilient pad is mounted on a hinged plate that is in turn pivoted on the bracket and a spring biases the plate toward the platform.

References Cited by the Examiner

UNITED STATES PATENTS 3,081,014 3/1963 Anderson et al.

WILLIAM W. DYER, Jr., *Primary Examiner.*

WILLIAM S. LAWSON, *Examiner.*